Patented Dec. 3, 1929

1,737,770

UNITED STATES PATENT OFFICE

CLINTON HENRY PARSONS, OF CHICAGO, ILLINOIS, ASSIGNOR TO SWIFT & COMPANY, OF CHICAGO, ILLINOIS, A CORPORATION OF ILLINOIS

FOOD PRODUCT AND METHOD OF MAKING THE SAME

No Drawing.  Application filed March 15, 1928.  Serial No. 262,060.

This invention relates to a new food product and more particularly to a dry powdered cheese product, and includes the new product itself and a method of preparing it.

Cheese in powdered form is desirable for culinary and table use, for example, for mixing with or sprinkling on other foods to impart a cheese flavor thereto. Grated cheese has been heretofore produced from hard cheese containing only about half as much butter fat as does the Cheddar type, particularly from the type of cheese known as Italian hard cheese, such as Romano, Parmesan, etc. The moisture content of these hard cheeses is comparatively low, and they are usually from one to three years old before they are used, so that powdered or grated cheese made from them is relatively expensive, and has heretofore been used only to a limited extent.

The softer Cheddar type cheeses do not readily lend themselves to powdering. If an attempt is made to produce powdered or grated Cheddar cheese in the same manner as is done with hard Italian cheeses, the attempt meets with failure because this type of cheese contains nearly twice as much butter fat and is very soft and creamy, i. e., of high moisture content. If these soft Cheddar cheeses are ground first and then only partially dried, the fat separates somewhat from the partially dried cheese, resulting in a smeary mass which is difficult or impossible to grate. Moreover, the temperature to which the cheese would probably be heated in drying or attempting to dry it would ordinarily be sufficiently high to change, if not to destroy, some of the delicate nutriments in the cheese.

It is an object of the present invention to provide a new food product in dry powdered form from soft cheeses, such as those of the Cheddar type, and a method of producing such a new food product from such soft cheeses.

I have discovered that by mixing ordinary ground cheese of the Cheddar type with a high grade powdered milk, powdered whay or powdered buttermilk either whole or skim, the resulting mass is porous and granular, and that by exposing this mass to a drying temperature of about 100° F. it will be converted into a dry product within a comparatively short time. This dry product can then be granulated or ground in such a manner as to allow it to be sifted through an ordinary salt shaker or other appropriate container for that purpose. This new product is suitable for culinary and table use.

The proportions of cheese and powdered milk, powdered whay or powdered buttermilk will vary somewhat with the particular cheese, but in general the amount of powdered milk, powdered whay or powdered buttermilk will be such that the resulting product is porous and granular and can be dried easily. For ordinary Cheddar cheese, containing around 38% of moisture, around 30 to 50 pounds of powdered milk may be employed per hundred pounds of cheese.

The grinding of the cheese and the incorporation of the powdered milk, powdered whay or powdered buttermilk therewith can be carried out in suitable apparatus which will insure uniform admixture of the powdered milk with the soft cheese. The powdered milk apparently absorbs moisture from the soft cheese or otherwise blends with it to give a mass which is porous and granular and which can then be readily dried without the objections incident to the drying of soft cheese by itself.

The drying of the mixture may be carried out either intermittently or continuously, by drying successive batches or by passing the mass continuously through a drier where it is subjected to the proper temperature for sufficient time to effect the desired drying.

The comparatively rapid drying of the admixed milk powder, whay powder or buttermilk powder and cheese, and the low temperature at which the product is dried, prevents it from objectionable change by loss of nutriments of the original cheese, so that the dried product contains all or substantially all of the nutriments which the original cheese contained. So also, because of its unchanged condition, it is soluble to the same degree as the ordinary Cheddar type of cheeses. Accordingly, it is a valuable product for cooking purposes. The dry and finely divided character of the product enables it to be readily distributed throughout the mass, where it is admixed with other ingredients, while the solubility of the cheese and of the milk powder, whay powder or buttermilk powder and the unchanged character of the cheese make the new food product a valuable one for use for cooking purposes. A product of this kind enables the housewife to have cheese of the Cheddar type available for use for cooking purposes in a form which can be kept for considerable periods of time and which can be used in cooking wherever ordinary cheese would be employed but with advantages in its use which ordinary cheese does not have. The pulverulent form of the new product enables it to be used conveniently, as it can be measured and distributed throughout the food much as salt or other powdered seasoning would be used.

Unlike the ordinary soft cheese from which it is made, the new food product can be kept for a long time without unusual precautions. Ordinary Cheddar cheese will remain sound for only a comparatively short time even when kept at a cool temperature under the best conditions; whereas the new food product of the present invention can be kept without objectionable deterioration for long periods of time.

It will be evident that the fineness to which the dried product is granulated or ground can be varied to give either a fine powdered product or a coarser granulated product to meet the requirements of the trade.

The new food product has the further advantage, among others, that it provides a new food product containing dry powdered milk, powdered whay or powdered buttermilk with the added nutritive value of the milk in addition to that of the cheese, but with the flavor of the cheese unimpaired. The new product, however, differs from milk powder by itself in that it has the characteristic cheese taste and a somewhat different texture from ordinary powdered milk. The new food product therefore partakes of the nature and advantages of powdered milk, powdered whay or powdered buttermilk which it contains, but also partakes of the nature and properties of cheese which it also contains in a new blended condition having advantages such as those hereinbefore mentioned.

The powdered and dry character of the new product enables it to be employed not only as a powder for sprinkling on or adding to other foods, but enables it to be employed in measured amounts for mixing with water of milk or butter or salad dressing to make a product of the consistency of cream cheese, or of a consistency such that it can be spread on bread to form sandwiches and the like. In this way a Cheddar cheese flavor can readily be imparted to sandwich mixtures, or a soft cheese can readily be prepared for use in making cheese sandwiches.

Although the use of powdered milk is particularly advantageous and I have referred in the accompanying claims to powdered milk, it is to be understood that powdered buttermilk or powdered whay may be used instead of the powdered milk.

I claim:

1. The method of preparing a dry comminuted food product, which comprises mixing cheese with powdered milk and drying the mass at a relatively low temperature.

2. The method of preparing a dry comminuted food product, which comprises mixing cheese with powdered milk and drying the mass at a temperature not substantially exceeding 100° F.

3. The method of producing a comminuted cheese product, which comprises drying the cheese in the presence of powdered milk and comminuting the dried product.

4. As a new composition of matter a substantially dry stable comminuted cheese product substantially as soluble as fresh cheese, which comprises a dried mixture of cheese and powdered milk.

In testimony whereof I affix my signature.

CLINTON HENRY PARSONS.